April 16, 1940.  J. W. GALLO  2,197,658
VELOCIPEDE
Filed Dec. 5, 1938  2 Sheets-Sheet 1
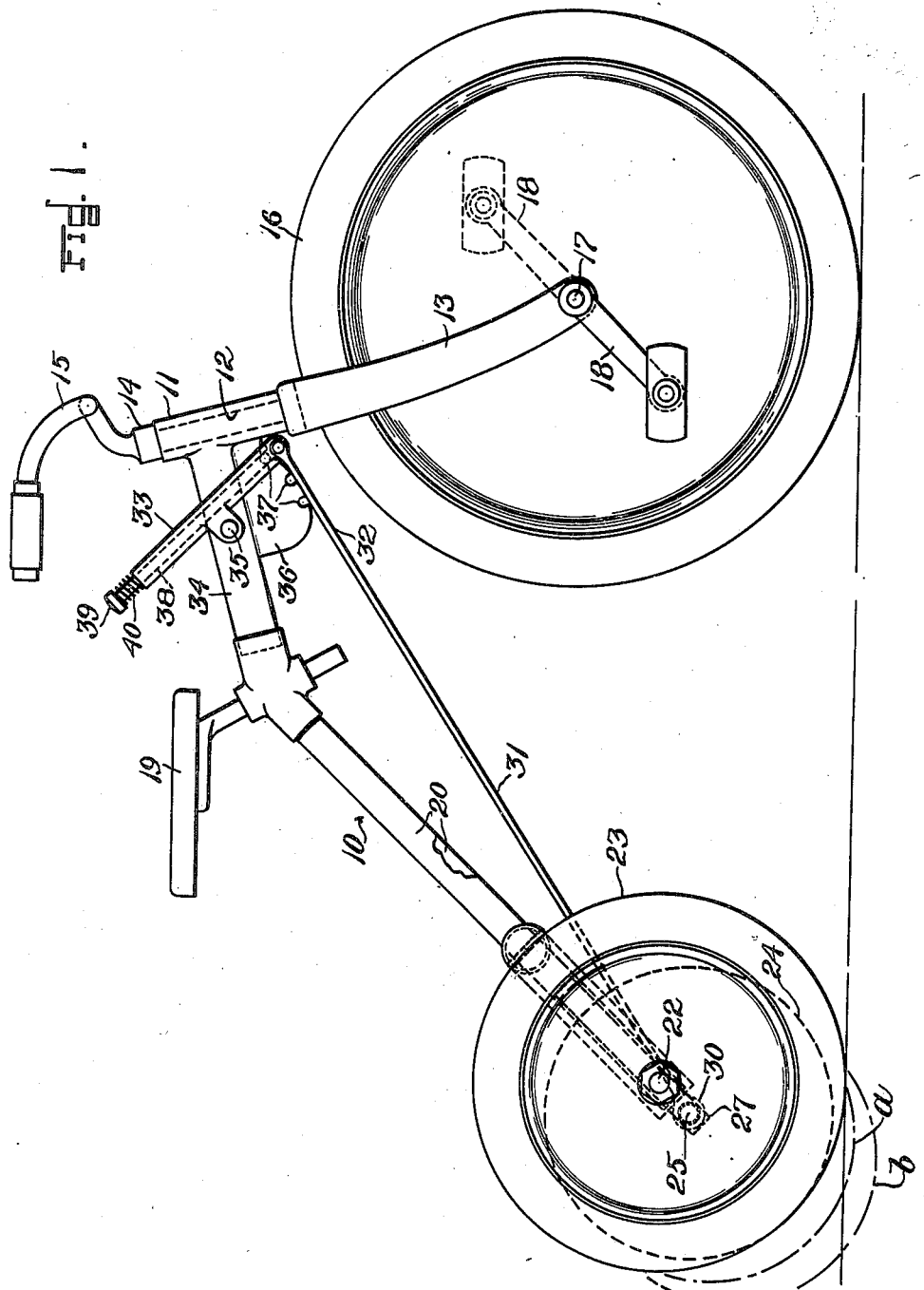
Inventor=
John W. Gallo,
By Arthur F. Randall,
Atty.

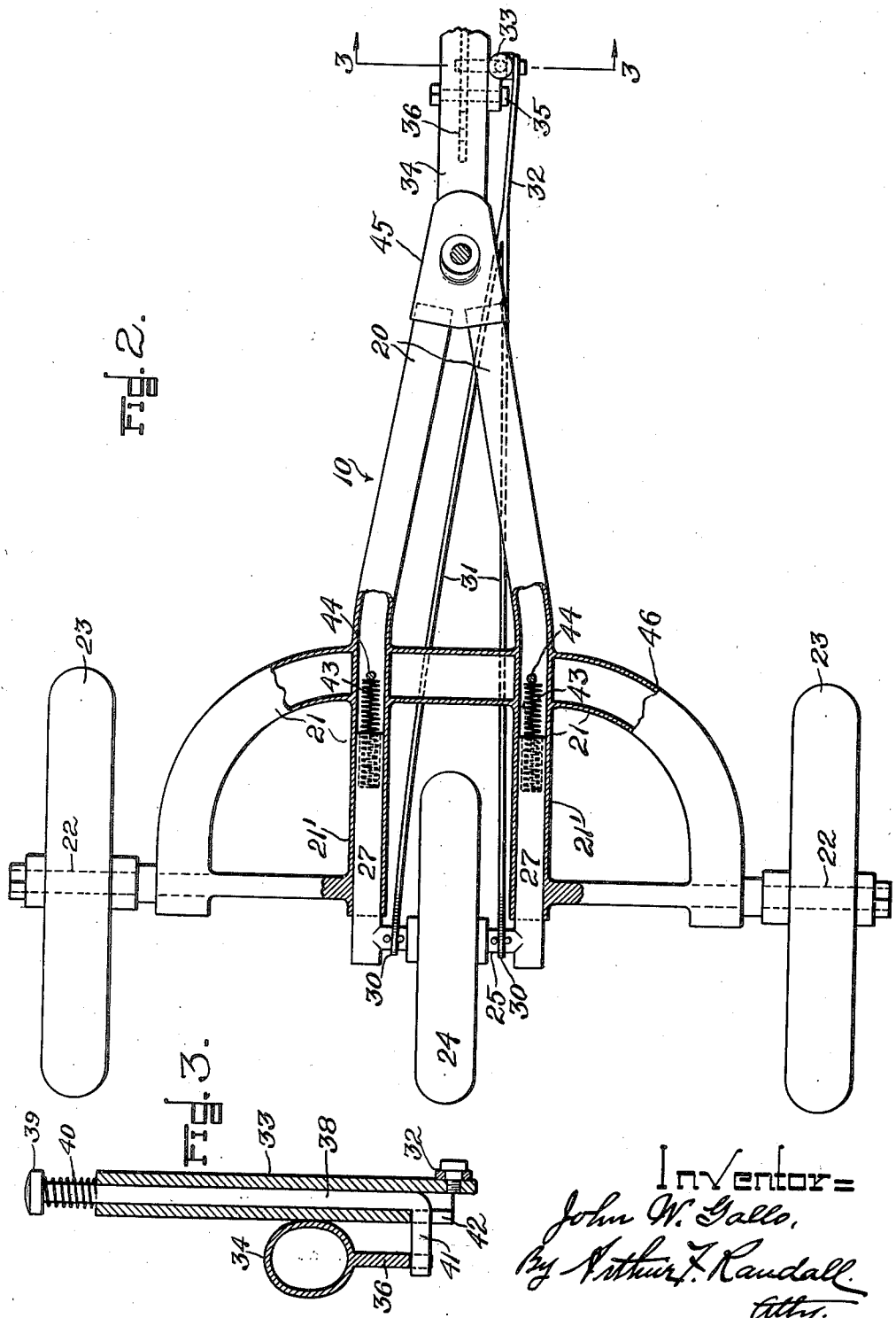

Patented Apr. 16, 1940

2,197,658

UNITED STATES PATENT OFFICE 2,197,658

VELOCIPEDE

John W. Gallo, Mineola, N. Y., assignor of one-half to Louis H. Segel, Everett, Mass.

Application December 5, 1938, Serial No. 245,055

3 Claims. (Cl. 280—7.10)

My invention relates to velocipedes and it has for its object to provide an improved convertible velocipede of the type shown and described in my U. S. Letters Patent No. 2,011,402, granted August 13, 1935, which can be used either as a bicycle or a tricycle.

To these ends my invention consists of a velocipede of the class described having the features of construction and mode of operation set forth in the following description, the several novel features of the invention being separately pointed out and defined in the claims at the close thereof.

In the accompanying drawings—

Figure 1 is a side elevation of my improved velocipede.

Figure 2 shows the rear end portion of the velocipede illustrated in Fig. 1, as viewed in plan.

Figure 3 is a section on line 3—3 of Fig. 2.

The embodiment of my invention herein illustrated comprises a main frame 10 whose forward end is constructed with a socket 11 within which is rotatably mounted a shank 12 of a front fork 13. The shank 12 of the fork 13 is provided at its upper end with a head 14 equipped with a pair of handle bars 15. A relatively large front wheel 16 has its axle 17 journaled in bearings at the lower ends of the arms of the fork 13. This axle is provided with crank pedals 18 by means of which the user propels the vehicle over the ground.

Intermediate its ends the main frame 10 is provided with a seat 19 for the rider.

So far as above described the construction is as usual.

The rear end portion of the main frame 10 is made with a rearwardly extending fork 20, each arm of which is itself forked as at 21. Each fork 21 includes as an integral part thereof an axle 22 on which is rotatably mounted a rear side wheel 23.

The inner arms of the forks 21 are straight and parallel with respect to each other and with respect to the vertical median plane of the structure. These two inner arms of the forks 21 are spaced-apart to provide a space between them for an intermediate wheel 24 which is disposed midway between the wheels 23 and within said vertical median plane. The intermediate wheel 24 is loosely mounted on a short axle 25 to each end of which is fixed the outer end of a stem 27 which is telescopically and slidably mounted within the straight inner arm of one of the forks 21. As will be clear the short axle 25, together with the stems 27, constitutes a yoke and the stems 27 of this yoke are slidably mounted within the straight inner arms 21' of the forks 21.

The opposite end portions of the short axle 25 occupy eyes 30 provided at the rear ends of two rod sections 31, Fig. 2, which form parts of a connecting rod 32 whose forward end is pivotally connected with the lower end of a lever 33.

The forward ends of the tubular fork members 20 of the frame are connected with the rear end of a single tubular frame section 34 whose forward end is provided with the socket 11 and the lever 33, just referred to, is pivotally mounted at 35 upon one side of the tubular section 34 adjacent to the socket 11.

Welded or otherwise secured to the under side of tubular section 34 and the rear side of socket 11 is a metal plate 36 whose lower edge is made arcuate and formed with three notches 37, said arcuate lower edge being concentric with the fulcrum or pivot 35 of lever 33.

The lever 33 is made tubular and has slidably mounted within it a lock-bar 38 provided at its upper end with a handpiece 39 between which and the upper end of lever 33 is arranged a coiled spring 40 by means of which the lock-bar is yieldingly urged upwardly. At its lower end the lock-bar 38 is made with a laterally projecting extension 41, Fig. 3, which occupies a slot 42 formed in the side wall of the tubular lever 33 at the lower end thereof, the side walls of said slot 42 engaging the extension 41 to hold the lock-bar 38, at all times, against rotating within the lever.

Within each straight arm 21' is arranged a coiled spring 43, one edge of which bears against an abutment pin 44 extending through its arm and the other end of which abuts the stem 27 which is mounted within the lower portion of said arm. These springs 43 are under compression and it will, therefore, be clear that when lever 33 is swung on its pivot or fulcrum 35 in one direction the springs 43 will slide the yoke 25—27 downwardly and when said lever is swung on its pivot or fulcrum in the opposite direction it will act through the connecting rod 32 to pull the yoke 25—27 upwardly into the arms 21'.

Normally, however, the lock-bar 38 through the engagement of its extension 41 with one or the other of the notches 37, serves to hold the yoke 25—27 against movement relatively to the frame.

When the extension 41 of the lock-bar 38 occupies the foremost notch 37 the connecting rod structure 32 maintains the intermediate wheel 24 above the level of the ground as indicated by dotted lines at 24 in Fig. 1. When the extension 41 of the lock-bar occupies the intermediate notch 37 the intermediate wheel 24 occupies the position indicated by dotted lines at a in Fig. 1 and when said extension 41 occupies the rearmost notch 37 the intermediate wheel 24 will occupy its lowermost position as indicated by dotted lines at b in Fig. 1.

When the intermediate wheel 24 is locked in position above the ground and the rider desires to transfer the support for the frame of the velocipede from the side wheels 23 to the intermediate wheel 24 he pushes downwardly on the hand-piece 39 to disengage extension 41 from the rack or plate 36 and forcibly swings lever 33 forwardly to the desired extent, the removal of hand pressure from hand-piece 39 permitting the spring 40 to reengage the extension 41 with the rack plate 36 so as to secure the intermediate wheel 24 in its lower operative position. It will also be clear that by releasing lever 33 and swinging the same in the opposite direction the intermediate wheel 24 can be adjusted upwardly and set either in its intermediate position or in its uppermost inoperative position.

The forward section 34 of the frame is a length of steel tubing whose forward end is welded to the socket 11 while its rear end is fitted into and welded to a coupling member or fitting 45. The arms or tines of the fork 20 are lengths of steel tubing whose forward ends are fitted and welded within the coupling 45. From the coupling 45 the arms of the fork 20 diverge rearwardly for a portion of their lengths and are then bent so that the rear end portions 21' thereof are parallel. These parallel rear end portions 21' are threaded through holes provided in a downwardly bowed rear end frame section 46 which is also a length of steel tubing. At the joints where the tines or arms of fork 20 pass through the section 46 the parts are integrated by welding or otherwise as shown in Fig. 2. Each axle bar 22 extends through apertures provided near the extremity of one of the arms of section 46 and has its inner end welded to the adjacent tine or arm of fork 20 and said axle bar is also welded to the arm of section 46.

What I claim is:

1. A convertible velocipede of the character described comprising a frame; a dirigible front wheel mounted on said frame; a pair of side wheels mounted on said frame; a third wheel disposed between said side wheels and mounted on said frame with provision for movement toward and from the ground; a tubular lever fulcrumed on said frame adjacent to the forward end thereof; means connecting said lever with said third wheel through which adjustment of said lever on its fulcrum moves said third wheel toward and from the ground; a lever-locking member slidably mounted within said tubular lever; a spring normally urging said member in one direction so as to hold the same in interlocked relationship with said frame, said member being manually operable to free said lever, and means on said frame with which said member is engageable to lock said lever in different angular positions.

2. A convertible velocipede of the character described comprising a frame made at its rear end with a pair of parallel tubular arms; a dirigible front wheel mounted on said frame; a pair of side wheels mounted on the rear end of said frame; a third wheel disposed midway between said side wheels; a yoke made with a pair of parallel stems slidably mounted within said arms, said yoke rotatably supporting said intermediate wheel; springs within said tubular arms for yieldingly urging said stems longitudinally; a lever fulcrumed on said frame adjacent to the forward end thereof; means connecting said lever with said yoke through which adjustment of said lever on its fulcrum in one direction shifts said yoke and intermediate wheel on the frame away from the ground and against the pressure of said springs and through which adjustment of said lever on its fulcrum in its opposite direction permits said springs to shift said yoke and intermediate wheel on said frame toward the ground, and means for holding said lever in its different adjusted positions.

3. In a convertible velocipede of the character described the combination of a frame comprising a tubular section made at its forward end with a socket for the shank of the fork of a front wheel; a tubular wheel-adjusting lever fulcrumed on said tubular section so as to swing on a horizontal axis; a spring-pressed lock-bar slidably mounted within said lever made at its lower end with a laterally projecting extension occupying a longitudinal slot formed in said lever, and a metal plate below said tubular section and integrally united edgewise with the latter and said socket and having a lower edge portion formed with a series of notches cooperating with said extension to secure said lever in different angular positions relatively to said frame.

JOHN W. GALLO.